United States Patent
Pearce

(10) Patent No.: US 6,178,550 B1
(45) Date of Patent: Jan. 23, 2001

(54) MECHANISM FOR OPTIMIZING LOCATION OF MACHINE-DEPENDENT CODE

(75) Inventor: John J. Pearce, Del Valle, TX (US)

(73) Assignee: Dell USA, Round Rock, TX (US)

( * ) Notice: Under 35 U.S.C. 154(b), the term of this patent shall be extended for 0 days.

(21) Appl. No.: 08/380,985

(22) Filed: Jan. 31, 1995

(51) Int. Cl.[7] .................................................. G06F 9/45
(52) U.S. Cl. ............................... 717/9; 711/163; 713/200
(58) Field of Search .................................. 395/700, 682, 395/410, 415, 416, 417, 421.11; 364/969, 969.1, 969.3, 255.7, 256.4, 969.4, 280.9, 963.3; 717/9; 711/163, 154, 170; 713/200

(56) References Cited

U.S. PATENT DOCUMENTS

| | | | |
|---|---|---|---|
| 4,928,237 | * 5/1990 | Bealkowski et al. | 364/200 |
| 4,972,338 | * 11/1990 | Crawford et al. | 364/200 |
| 5,063,496 | * 11/1991 | Dayan et al. | 395/700 |
| 5,075,845 | * 12/1991 | Lai et al. | 395/425 |
| 5,144,551 | * 9/1992 | Ceputis | 395/425 |

OTHER PUBLICATIONS

Gephardt, D. et al, "System Management Mode in Ain 386 Microprocessors", Microprocessor Report, Feb. 12, 1992 v6 n2 p. 17(2).*

Ellis, S., "The Intel System Management Mode", Microprocessor Report, Feb. 12, 1992 v6, n2 p. 16(2).*

Thorson, M., "System Management Mode Explained; Despite Common Functions, Implementation Details Differ", Microprocessor Report Jun. 17, 1992 v6 n8 p. 14(4).*

* cited by examiner

Primary Examiner—Tariq R. Hafiz
Assistant Examiner—Tuan Q. Dam
(74) Attorney, Agent, or Firm—Haynes and Boone, LLP

(57) ABSTRACT

Method and apparatus for optimizing the location of machine-dependent code is disclosed. In a departure from the art, code for implementing an applications program interface (API) or other machine dependent program is divided into a system management mode (SMM) portion and a non-SMM portion, depending on whether the code needs to be implemented in a secure environment or not, respectively. In a preferred embodiment, the non-SMM portion of the API maintains a BIOS jump table comprising an indexed array of function addresses, and the SMM portion of the API maintains a parallel, but nonidentical, SMM jump table. For each API function that is to be executed in SMM, that is, for each function that must be executed in a secure environment, the indexed BIOS jump table entry calls an SMM interface (SMI) function, which initiates SMM by generating a system management interrupt and accesses the parallel SMM jump table. The indexed SNM jump table entry is used to call the designated function, which is then executed in SMM.

11 Claims, 1 Drawing Sheet

MECHANISM FOR OPTIMIZING LOCATION OF MACHINE-DEPENDENT CODE

TECHNICAL FIELD

The invention relates generally to the implementation of extended applications program interfaces (APIs) in microprocessors having a system management mode and, more particularly, to means for optimizing the location of code for implementing such APIs with respect to the need for security and efficiency.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs that can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, although for reasons other than maximizing battery life, it has become desirable to more efficiently manage power consumption of desktop PCs in order to minimize overall operating costs.

Initially, such power management was accomplished using proprietary software drivers developed by PC manufacturers that monitored system activity with respect to hardware, firmware and operating system(s). Although fairly effective, the use of such drivers introduced additional problems, such as creating incompatibilities with user's applications, due to the fact that the drivers typically were not effective at detecting every operating system and application installed on the portable PC. Partially in response to these problems, in 1990, Intel introduced its Intel386™ SL CPU, which was the first standard microprocessor designed to support power management that was operating system-independent. Specifically, the Intel386 SL CPU was the first to implement a System Management Mode (SMM) that enabled the implementation of advanced power management features without jeopardizing operating system or application integrity.

Although initially developed by Intel, some form of SMM is now available from most manufacturers of '386 and subsequent microprocessors. The core features of such SMMs are basically the same, in that all include a non-maskable hardware interrupt, specifically, a system management interrupt, for invoking a mode-independent software routine in a separate SMM address space. Power management is the obvious application for SMM; however, other functions supported by SMMs include network drivers, device drivers, file translation software, data security and supervision.

Programs running in SMM execute independently of the processor mode and the operating system in a dedicated SMM memory space. This liberates system and power management functionality from dependence on the operating system and allows flexibility and differentiation in the rest of the system logic. SMM code executes from a protected space, which may vary in size from several kilobytes to several gigabytes, depending on the particular implementation and capabilities of the computer. SMM is initiated by a system management interrupt which saves the state of the CPU and then causes the CPU to jump directly to SMM code in SMM space. All PC memory and I/O space is accessible from SMM.

One of the principal benefits of SMM is that it provides a secure memory location for status and control code; however, the price of this security is an often extremely high overhead in terms of processing resources required to save the state of the CPU before entering SMM. In some platform designs, extended applications program interfaces (APIs), such as Advanced Power Management (APM), Plug and Play (PnP) and other machine dependent programs, need to run with maximum efficiency with respect to part of their functionality, but with maximum security with respect to other parts. Typically, this problem is solved by sacrificing efficiency for security and executing the entire extended API in the SMM.

Therefore, what is needed is a method of executing extended API software in a more efficient manner, but without a significant reduction in security where necessary.

SUMMARY OF THE INVENTION

The foregoing problems are solved and a technical advance is achieved by method and apparatus for optimizing the location of machine-dependent code. In a departure from the art, code for implementing an applications program interface (API), or other machine-dependent program, is divided into a system management mode (SMM) portion, which includes all program functionality that is preferably executed in a secure environment, and a non-SMM portion, which includes the remaining program functionality. In a preferred embodiment, the non-SMM portion of the API maintains a jump table, referred to herein as the BIOS jump table, comprising an indexed array of function addresses, wherein each executable function is indexed by a corresponding function number, such that the function may be accessed and executed by specifying its function number. Similarly, the SMM portion of the API maintains a parallel, but nonidentical, jump table, referred to herein as the SMM jump table, wherein each function is identified by the same function number by which it is identified in the BIOS jump table.

For each API function that is to be executed in SMM, that is, for each function that must be executed in a secure environment, the BIOS jump table entry indexed by the corresponding function number calls an SMM interface (SMI) function. The SMI function initiates SMM by generating a system management interrupt and accesses the parallel SMM jump table. The SMM jump table entry indexed by the designated function number is used to call the designated function, which is then executed in SMM. Examples of functions that would typically be executed in SMM include password validation and set power state functions, as well as hardware functions which, if interrupted before completion, could jeopardize the integrity of the hardware, such as LCD panel blanking sequencing. In contrast, for each function that is not to be implemented in SMM, that is, for each function with respect to which security is not a major concern, the BIOS jump table entry indexed by the function number is used to call the requested function directly from BIOS.

A technical advantage achieved with the invention is that the overhead inherent in the use of SMM can be restricted to those functions that require the secure environment that SMM can provide.

A further technical advantage achieved with the invention is that it can be implemented using an indirect table of functions. a case statement table of executable code, or if-then-else statements.

A further technical advantage achieved with the invention is that it can be implemented using static tables, which allow for tighter code, or dynamic tables, which allow real-time adaptation to particular system management situations.

DETAILED DESCRIPTION OF THE PREFERRED EMBODIMENT

Figure 1A:
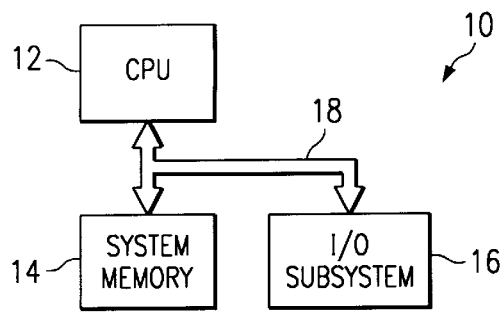
FIG. 1A is a system block diagram of a portable computer system in which the preferred embodiment of the present invention may be implemented.

FIG. 1A is a system block diagram of a portable personal computer (PC) 10 in which the preferred embodiment of the present invention may be implemented. The PC 10 comprises a CPU 12, system memory 14 and an I/O subsystem 16 interconnected via a system bus 18. The CPU 12 may be any microprocessor having a System Management Mode (SMM), such as the i486SL microprocessor available from Intel Corporation of Santa Clara, Calif.

Figure 1B:
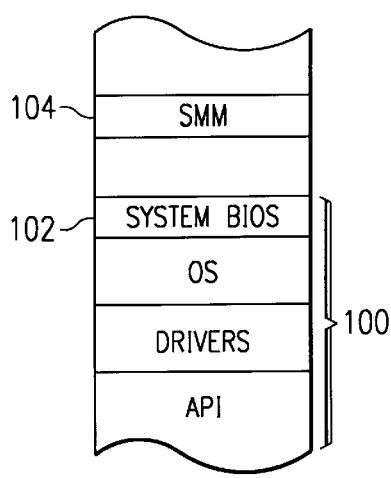
FIG. 1B is a memory map of system memory of the PC of FIG. 1A.

FIG. 1B is a memory map of the system memory 14. As illustrated in FIG. 1B, system memory 14 includes a base memory section 100 comprising BIOS code space 102, as well as operating system, driver and API code space, and a secure memory section comprising SMM code space 104. It should be recognized that the particular location of the SMM code space 104 in system memory 14 will depend on the chipset used to implement SMM. For example, in a preferred embodiment using a chipset available from Western Digital Corporation of Irvine, Calif., SMM code extends from memory address 30000h to 3FFFFh.

Referring to FIGS. 1A and 1B, code for implementing an extended API may be stored in system memory 14 for implementation by the CPU 12. Examples of such extended APIs include Advanced Power Management (APM), Plug and Play (PnP) and any other machine-dependent program at least a portion of which is preferably implemented in a secure environment. As will be described, in accordance with a feature of the present invention, the API code is divided into a non-SMM portion comprising a BIOS jump table stored in the BIOS code space 102 of system memory 14 and an SMM portion comprising an SMM jump table stored in the SMM code space 104 of system memory 14.

Assuming for the sake of example that the API code corresponds to an APM, system BIOS code 102 will contain an entry point for an APM interrupt handler. In the preferred embodiment, the APM interrupt handler of the BIOS code 102 includes a BIOS jump table of APM functions indexed by function number. An exemplary APM BIOS jump table is shown below as TABLE I:

TABLE I

BIOS JUMP TABLE

| FUNCTION NO. | DESCRIPTION | FUNCTION NAME |
| --- | --- | --- |
| 0 | APM installation check | APMcheck |
| 1 | real mode connect | APMconnect |
| 2 | protected mode connect 16 bit | APMconnect16 |
| 3 | protected mode connect 32 bit | APMconnect32 |

TABLE I-continued

BIOS JUMP TABLE

| FUNCTION NO. | DESCRIPTION | FUNCTION NAME |
| --- | --- | --- |
| 4 | disconnect | APMdisconnect |
| 5 | CPU idle | APMidle |
| 6 | CPU busy | APMbusy |
| 7 | set power state | APMsmi |

Referring to TABLE I above, each of the functions indexed by function numbers 0–6 are such that they may be implemented without regard to security; therefore, in the interest of efficiency, those functions are executed by a direct call to the function indexed by the function number from the BIOS jump table (TABLE I). For example, if function number 5 is specified by the APM interrupt handler, the function "APMidle" called and executed. In contrast, the function for setting the power state of the PC 10 (function number 7) must be executed in a secure environment. Accordingly, an SMM interface function, (APMsmi) rather than the set power state function itself, is called from the BIOS jump table (TABLE I).

The SMM code in the SMM code space 104 contains an entry point for an APM SMM interrupt handler invoked by the function APMsmi. The APM SMM interrupt handler includes an SMM jump table that parallels the BIOS jump table (TABLE I), as shown below in TABLE II:

TABLE II

SMM JUMP TABLE

| FUNCTION NO. | DESCRIPTION | FUNCTION NAME |
| --- | --- | --- |
| 0 | APM installation check | APMcheck |
| 1 | real mode connect | APMconnect |
| 2 | protected mode connect 16 bit | APMconnect16 |
| 3 | protected mode connect 32 bit | APMconnect32 |
| 4 | disconnect | APMdisconnect |
| 5 | CPU idle | APMidle |
| 6 | CPU busy | APMbusy |
| 7 | set power state | APMsetpowerstate |

Referring to TABLES I and II, above, the function indexed by function number 7 of TABLE I results in an APMsmi function being called. Execution of the APMsmi function in turn invokes the APM SMM interrupt handler. At this point, the SMM jump table (TABLE II) is referenced and the function indexed by function number 7 (APMsetpowerstate) is called and executed.

Figure 2:
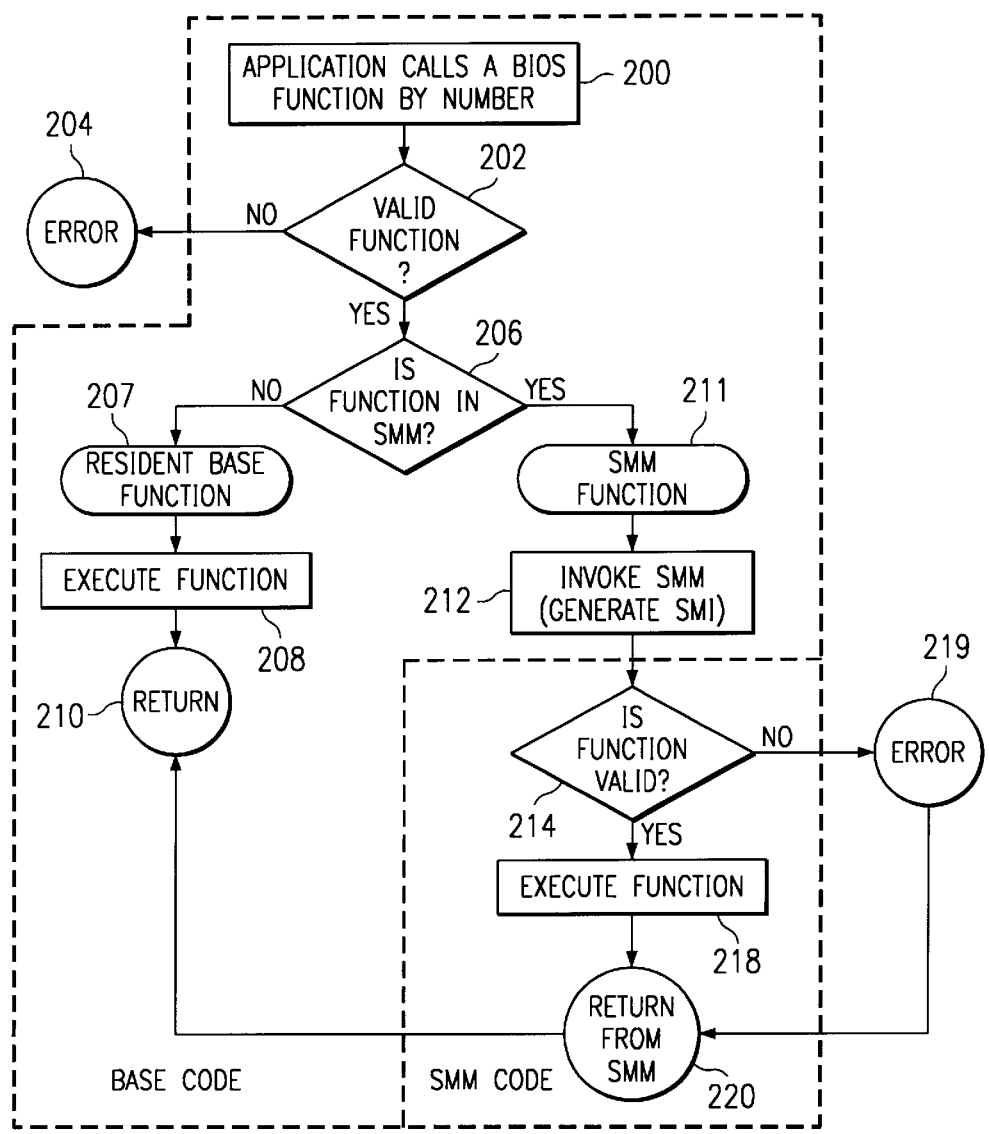
FIG. 2 is a flowchart of the operation of the present invention.

FIG. 2 is a flowchart of the operation of the system of the present invention. In step 200, an extended API, for example, APM, calls a BIOS function by its function number. In step 202, a determination is made whether the specified function number identifies a valid function; that is, whether the specified function numbers is within the range of valid function numbers. For example, referring to TABLE I above, the range of valid function numbers would be 0 through 7. If it is determined that the specified function number is not valid, an error results in step 204; otherwise, execution proceeds to step 206. In step 206, a determination is made whether the indexed function is resident in SMM code space 104. It should be recognized that in the preferred implementation of the present invention using jump tables, the determination made in step 206 is automatic, as it is inherent in the operation of the jump tables. If in step 206, the indexed function is not resident in SMM code space 204, execution proceeds to step 207, in which the function is designated as a resident base function, and then to step 208, in which the indexed function is executed. In step 210, execution returns to the application that called the function in step 200.

If in step 206 it is determined that the indexed function is resident in SMM code space 104, execution proceeds to step 211, in which the function is designated as an SMM function, and then to step 212, in which an SMM interface function (APMsmi) is invoked, it being understood that invocation of SMM involves gathering relevant information to be passed to SMM and then generating a system management interrupt. In step 214, a determination is made whether the indexed function is valid, as described above with reference to step 202 If so, execution proceeds to step 218. In step 218, the indexed function is executed in SMM code space 104 and execution proceeds to step 220. If in step 214 a determination is made that the indexed function is not valid, an error results in step 219 and execution proceeds directly to step 220. In step 220, SMM is exited. Execution then proceeds to step 210, in which execution returns to the application that called the function in step 200.

As illustrated in FIG. 2 by dashed lines, steps 200, 202, 206, 207, 208, 210, 211 and 212 are executed in base memory 100, while steps 214, 218, 219 and 220 are executed in SMM code space 104.

In this manner, only those functions that need to execute in a secure environment, such as set power state, password validation, or that potentially affect the integrity of the hardware, such as an LCD panel sequencing routine for blanking the LCD, will be executed in SMM, thereby potentially substantially reducing the amount of overhead involved in implementing the functions, while not sacrificing security where necessary.

It is understood that the present invention can take many forms and embodiments. The embodiments shown herein are intended to illustrate rather than to limit the invention, it being appreciated that variations may be made without departing from the spirit or the scope of the invention. For example, the function tables may be replaced by switch statements or if-then-else statements. Moreover, the tables could be static, allowing for tighter program code, or dynamic, allowing for real-time adaptation to system management situations. Finally, although the BIOS and SMM jump tables are shown as being symmetric, it would be possible to implement each table containing only those entries to be executed in the corresponding mode.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer system comprising system memory and a processor capable of operating in a system management mode (SMM), a method for enabling the optimization of the location in said system memory of machine-dependent code for implementing a plurality of functions comprising an applications program interface (API), a portion of said system memory comprising secure memory space accessible only while said SMM is invoked, the method comprising:

storing code for implementing less than all of said plurality of functions in said secure memory space;

storing code for implementing each of the remaining ones of said plurality of functions in memory space other than said secure memory space;

responsive to an applications program calling one of said plurality of functions, determining whether code for implementing said called one of said plurality of functions is stored in said secure memory space;

responsive to a determination that said code for implementing said called one of said plurality of functions is stored in said secure memory space;

invoking said SMM;

executing said code for implementing said called one of said plurality of functions; and returning from said SMM; and responsive to a determination that said code for implementing said called one of said plurality of functions is not stored in said secure memory space, executing said code for implementing said called one of said plurality of functions.

2. The method of claim 1 wherein at least one of said remaining ones of said plurality of functions is an SMM interface function, and wherein said invoking said SMM comprises executing said SMM interface function.

3. The method of claim 2 wherein said executing said SMM interface function comprises generating a system management interrupt to said processor.

4. In a computer comprising system memory and a processor capable of operating in a system management mode (SMM), an apparatus for enabling the optimization of the location in said system memory of machine-dependent code for implementing a plurality of functions comprising an applications program interface (API), a portion of said system memory comprising secure memory space that is accessible only while said SMM is invoked, wherein code for implementing each of a first number of said plurality of functions comprising less than all of said plurality of functions is stored in said secure memory space and code for implementing each of the remaining ones of said plurality of functions is stored in system memory space other than said secure memory space, the apparatus comprising:

means responsive to a function being called by an applications program for determining whether code for implementing said called function is stored in said secure memory space;

means for invoking said SMM, executing said code for implementing said called function, and returning from said SMM responsive to a determination that said code for implementing said called function is stored in said secure memory space; and means for executing said code for implementing said called function responsive to a determination that said code for implementing said called function is not stored in said secure memory space.

5. The apparatus of claim 4 wherein at least one of said remaining ones of said plurality of functions is an SMM interface function, and wherein said means for invoking said SMM comprises means for executing said SMM interface function.

6. The apparatus of claim 5 wherein said means for executing said SMM interface function comprises means for generating a system management interrupt to said processor.

7. The apparatus of claim 4 further comprising means for determining whether said called function is valid prior to said determining whether code for implementing said called function is stored in said secure memory.

8. The apparatus of claim 7 wherein said means for determining whether said called function is valid comprises means for determining whether said called function is one of said plurality of functions.

9. Apparatus for optimizing the location in system memory of a computer of machine-dependent code for implementing a plurality of functions comprising an applications program interface (API), said system memory comprising secure memory space and nonsecure memory space, the apparatus comprising:

a processor electrically connected to said system memory and capable of operating in a system management mode (SMM), wherein said secure memory space is only accessible while said processor is operating in said SMM;

code stored in said secure memory space and executable by said processor for implementing each of a first set of said plurality of functions comprising less than all of said plurality of functions;

code stored in said nonsecure memory space and executable by said processor for implementing each of a second set of said plurality of functions;

logic executable by said processor and responsive to a function of said second set of said plurality of functions being called by said API for executing code for implementing said called function; and logic executable by said processor and responsive to a function of said first set of functions being called by said API for causing said processor to operate in said SMM and executing code for implementing said called function.

10. The apparatus of claim 9 wherein at least one function of said second set of said plurality of functions is an SMM interface function, and wherein said logic for causing said processor to operate in said SMM comprises logic for implementing said SMM interface function.

11. The apparatus of claim 9 wherein said logic for causing said processor to operate in said SMM comprises logic for generating a system management interrupt.

* * * * *